United States Patent
Uno et al.

(10) Patent No.: US 9,051,463 B2
(45) Date of Patent: Jun. 9, 2015

(54) PROCESS FOR PRODUCING POLYCARBONATE COMPOSITIONS

(71) Applicant: SABIC Innovative Plastics IP B.V., Bergen op Zoom (NL)

(72) Inventors: Kazutoyo Uno, Murcia (ES); Ignacio Vic Fernandez, Murcia (ES); David del Agua Hernandez, Cartagena (ES)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/074,181

(22) Filed: Nov. 7, 2013

(65) Prior Publication Data

US 2014/0128526 A1 May 8, 2014

(30) Foreign Application Priority Data

Nov. 7, 2012 (EP) .................................... 12382436

(51) Int. Cl.
| | |
|---|---|
| C08L 83/04 | (2006.01) |
| C08L 69/00 | (2006.01) |
| C08G 64/30 | (2006.01) |

(52) U.S. Cl.
CPC ............. C08L 69/00 (2013.01); *C08L 2201/10* (2013.01); *C08G 64/307* (2013.01); C08L 83/04 (2013.01)

(58) Field of Classification Search
None
See application file for complete search history.

(56) References Cited

U.S. PATENT DOCUMENTS

| | | | |
|---|---|---|---|
| 5,606,007 A | 2/1997 | Sakashita et al. | |
| 6,136,945 A | 10/2000 | Mestanza | |
| 6,431,735 B2 * | 8/2002 | Fraizer .......................... | 362/509 |
| 6,504,000 B1 | 1/2003 | Volkers et al. | |
| 6,569,985 B2 * | 5/2003 | McCloskey et al. .......... | 528/196 |
| 2005/0049368 A1 | 3/2005 | Maruyama et al. | |
| 2009/0162628 A1 | 6/2009 | Kurokawa et al. | |
| 2011/0060084 A1 * | 3/2011 | Jung et al. ..................... | 524/387 |

FOREIGN PATENT DOCUMENTS

| | | | |
|---|---|---|---|
| JP | 2005113087 A | | 4/2005 |
| JP | 2010202825 A | * | 9/2010 |
| JP | 2012007054 A | | 1/2012 |
| JP | 2012171977 A | | 9/2012 |
| JP | 2012184345 A | * | 9/2012 |

OTHER PUBLICATIONS

Machine Translation of JP2012-184345A. Sep. 27, 2012.*
Partial Written Translation of JP2012-184345A. Sep. 27, 2012.*
Partial Written Translation of JP2012-007054A. Jan. 12, 2012.*

(Continued)

*Primary Examiner* — Robert C Boyle
*Assistant Examiner* — Stephen Rieth
(74) *Attorney, Agent, or Firm* — Cantor Colburn LLP

(57) ABSTRACT

A method for manufacturing a polycarbonate composition having improved transparency can comprise reacting an aromatic dihydroxy compound and a diaryl carbonate under melt polymerization conditions to provide a polycarbonate; and contacting the polycarbonate with a polydiorgano siloxane having a kinematic viscosity of less than 20 mm$^2$/sec at 25° C. as determined in accordance with ASTM D445, and an optional additive thereby making the polycarbonate composition. The polycarbonate composition has haze less than 1% as determined in accordance with ASTM D1003-07, and can be used for optical applications such as automotive headlamps.

16 Claims, 1 Drawing Sheet

(56) References Cited

OTHER PUBLICATIONS

Machine Translation of JP 2010-202825A. Sep. 16, 2010.*
International Search Report for International Application No. PCT/IB2013/059958, International Application Filing Date Nov. 6, 2013, Date of Mailing Mar. 28, 2014, 5 pages.
Written Opinion for International Application No. PCT/IB2013/059958, International Application Filing Date Nov. 6, 2013, Date of Mailing Mar. 28, 2014, 6 pages.
Japanese Patent No. 2005113087 (A); Publication Date: Apr. 28, 2005; Abstract Only; 1 Page.
Japanese Patent No. 2012007054 (A); Publication Date: Jan. 12, 2012; Abstract; Document No. XP-002694766; 4 Pages.
Japanese Patent No. 2012007054 (A); Publication Date: Jan. 12, 2012; Machine Translation from the Japanese Patent Office; 78 Pages.
Japanese Patent No. 2012171977 (A); Publication Date: Sep. 10, 2012; Abstract; Document No. XP-002694767; 4 Pages.
Japanese Patent No. 2012171977 (A); Publication Date: Sep. 10, 2012; Machine Translation from the Japanese Patent Office; 45 Pages.
Extended European Search Report; European Application No. 12382436.9; Date of Mailing: Apr. 16, 2013; 6 Pages.

* cited by examiner

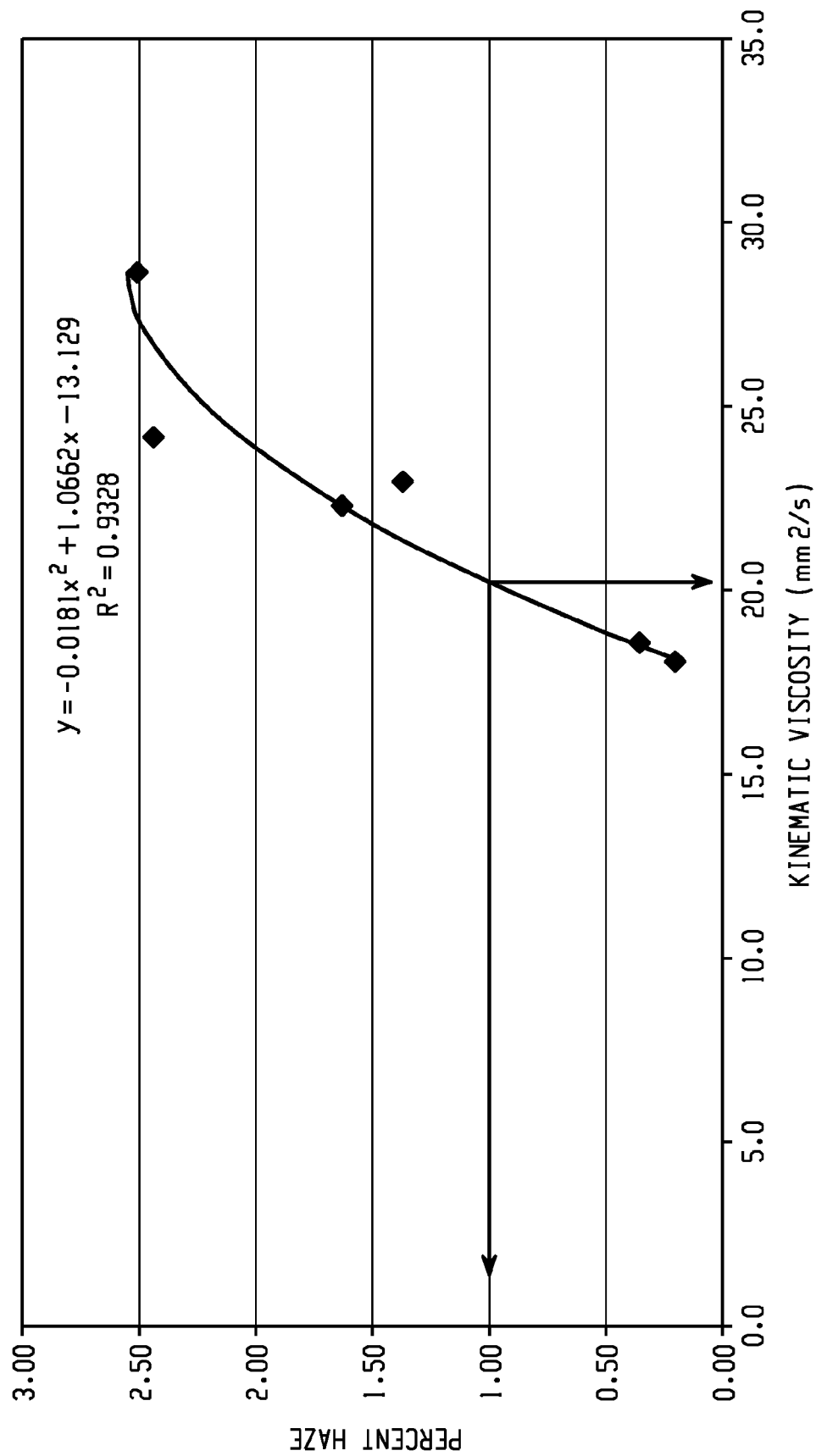

PROCESS FOR PRODUCING POLYCARBONATE COMPOSITIONS

CROSS REFERENCE TO RELATED APPLICATIONS

The present application claims priority to European Application Serial No. 12382436.9, filed Nov. 7, 2012, the contents of which are incorporated herein in their entity by reference.

TECHNICAL FIELD

The present disclosure generally relates to methods for manufacturing polycarbonate compositions, and especially relates to methods for preparing polycarbonate compositions having improved transparency.

BACKGROUND

Polycarbonates are synthetic thermoplastic resins that may be derived from bisphenols and phosgene in the presence of an aqueous phase and an organic solvent (interfacial method) or from bisphenols and diaryl carbonates in a solventless transesterification process (melt method). Polycarbonates are useful for forming a wide variety of products including articles and components for auto parts, electronic appliances, and cell phones. Because of their broad use, particularly in optical applications, such as vehicle headlamps, light covers, see-through protective coverings, lenses, and transparent films, it is desirable to provide polycarbonates with excellent weatherability, heat resistance, and transparency. It is also desirable if the polycarbonates can be easily processed.

There remains a need for producing polycarbonates having heat stability, weatherability, and/or mold release properties, and a desired transparency.

SUMMARY

Disclosed herein is a method for manufacturing a polycarbonate composition having improved transparency. The method comprises: reacting an aromatic dihydroxy compound and a diaryl carbonate in the presence of a catalyst to provide a polycarbonate; adding to the polycarbonate a polydiorgano siloxane having a kinematic viscosity of less than or equal to 20 mm$^2$/sec at 25° C. as determined in accordance with ASTM D445, and optionally an additive to form the polycarbonate composition, wherein a 3 mm plaque of the polycarbonate composition has a haze of less than or equal to 1% as determined in accordance with ASTM D1003-07, Procedure A, illuminant CIE-D65.

Also disclosed, are polycarbonate compositions manufactured by the method and articles comprising the polycarbonate compositions.

The above described and other features are exemplified by the following figures and detailed description.

BRIEF DESCRIPTION OF THE DRAWINGS

The following drawing is presented for the purposes of illustrating the exemplary embodiments disclosed herein and not for the purposes of limiting the same.

FIG. 1 illustrates the relationship between the kinematic viscosity of release agents and the haze of polycarbonate compositions, to which the release agents are added.

DETAILED DESCRIPTION

Previously, improving heat stability, weatherability, and mold release properties of polycarbonates resulted in articles of manufacture that have a significant loss of transparency. After exploring different process and material variables, it has now been surprisingly discovered that the transparency, as is evidenced by low haze, of articles formed with polycarbonate compositions are significantly affected by the mold release agent. Particularly, the molecular weight of the mold release agent can have a significantly negative effect on the haze of an article formed by the polycarbonate composition.

Not to be limited by theory, it has been discovered that while UV absorbers, heat stabilizers, and color agents do not have significant impact on haze generation, mold release agent, e.g., a polydiorgano siloxane (such as polymethylphenyl siloxane (PPMS)) can greatly affect the haze of polycarbonate products. Furthermore, it is discovered that the viscosity parameter of the release agent, surprisingly, is the factor that has a direct impact on the optical properties of polycarbonate compositions. In particular, it has been found that by using a mold release agent (e.g., polydiorgano siloxane such as poly(dimethyl diphenyl siloxane)) having a kinematic viscosity of less than or equal to 20 mm$^2$/sec as measured by Canno-Fenske Visco meter at 25° C., in accordance with ASTM D445, transparency of the polycarbonate product can be significantly improved as compared to using the same mold release agent having a kinematic viscosity of greater than 20 mm$^2$/sec at 25° C. and measured in the same manner. This allows preparation of polycarbonate compositions having excellent transparency as well as balanced heat stability, weatherability, and mold release properties.

A method for manufacturing a polycarbonate composition having improved transparency can include reacting an aromatic dihydroxy compound and a diaryl carbonate to produce a polycarbonate; contacting the polycarbonate with a polydiorgano siloxane having a kinematic viscosity of less than or equal to 20 mm$^2$/sec at 25° C. as determined in accordance with ASTM D445, and an optional additive. The combination of the polycarbonate, the polymethylphenyl siloxane, and the optional additive (such as UV absorbers, heat stabilizers, color agents, or a combination comprising one of the foregoing) can be further extruded thereby making the polycarbonate composition.

As used herein, a "polycarbonate" means compounds having repeating structural carbonate units of formula (1)

(1)

in which at least 60% of the total number of R$^1$ groups contain aromatic moieties and the balance thereof are aliphatic, alicyclic, or aromatic. Each R$^1$ can be a C$_{6-30}$ aromatic group, that is, contains at least one aromatic moiety. R$^1$ can be derived from a dihydroxy compound of the formula HO—R$^1$—OH, in particular of formula (2)

HO-A$^1$-Y$^1$-A$^2$-OH (2)

wherein each of A$^1$ and A$^2$ is a monocyclic divalent aromatic group and Y$^1$ is a single bond or a bridging group having one or more atoms that separate A$^1$ from A$^2$. In an embodiment, one atom separates A$^1$ from A$^2$. Specifically, each R$^1$ can be derived from a dihydroxy aromatic compound of formula (3)

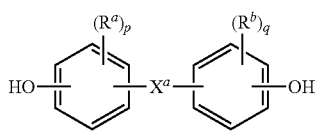

(3)

wherein $R^a$ and $R^b$ are each independently a halogen or $C_{1-12}$ alkyl group; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. The variables p and q can each be 1, and $R^a$ and $R^b$ are each a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

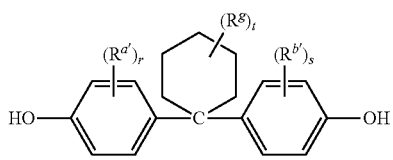

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. At least one of each of $R^{a'}$ and $R^{b'}$ can be disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. $R^{a'}$ and $R^{b'}$ can each independently be $C_{1-4}$ alkyl, $R^g$ can be $C_{1-4}$ alkyl, r and s can each be 1, and t can be 0 to 5. $R^{a'}$, $R^{b'}$, and $R^g$ can each be methyl, r and s can each be 1, and t can be 0 or 3. The cyclohexylidene-bridged bisphenol can be the reaction product of two moles of o-cresol with one mole of cyclohexanone. The cyclohexylidene-bridged bisphenol can be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

$X^a$ can be a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ can be the same or different $C_{1-6}$ alkylene group and W can be a $C_{3-12}$ cycloalkylidene group or a $C_{6-16}$ arylene group.

$X^a$ can also be a substituted $C_{3-18}$ cycloalkylidene of formula (5)

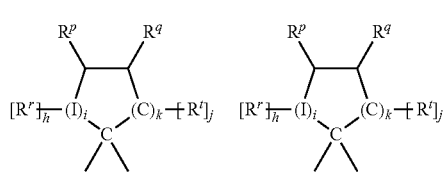

(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. Two adjacent groups (e.g., $R^q$ and $R^t$ taken together) can form an aromatic group or $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

Other possible aromatic dihydroxy compounds include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

The diaryl carbonate used to prepare the polycarbonate is not particularly limited and can be a diaryl carbonate of formula (I)

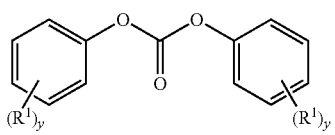

(I)

wherein each $R^1$ is independently a halogen atom, nitro group, cyano group, $C_{1-20}$ alkyl group, $C_{1-20}$ alkoxy carbonyl group, $C_{4-20}$ cycloalkyl group, or $C_{6-20}$ aryl group; and each y is independently an integer of 0-5.

Some specific examples diaryl carbonate include diphenyl carbonate, bis(4-methylphenyl)carbonate, bis(4-chlorophenyl) carbonate, bis(4-fluorophenyl) carbonate, bis(2-chlorophenyl) carbonate, bis(2,4-difluorophenyl) carbonate, bis (4-nitrophenyl)carbonate, bis(2-nitrophenyl) carbonate, bis (methyl salicyl) carbonate, and the like, or a combination comprising at least one of the foregoing.

In general, in the melt polycondensation process, the diaryl carbonates are used in an amount of 1.0 to 1.30 moles, specifically 1.01 to 1.20 moles, with respect to 1 mole of aromatic dihydroxy compounds.

"Polycarbonates" include homopolycarbonates (wherein each $R^1$ in the polymer is the same), copolymers comprising different $R^1$ moieties in the carbonate ("copolycarbonates"), and combinations comprising at least one of homopolycarbonates and/or copolycarbonates.

Polycarbonates can be manufactured by processes such as interfacial polymerization and melt polymerization. Although the reaction conditions for interfacial polymerization can vary, the process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations comprising at least one of the foregoing.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting aromatic dihydroxy compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 daltons. In one or more subsequent polymerization stages the number average molecular weight (Mn) of the polycarbonate is increased to between about 8,000 and about 25,000 daltons (using polycarbonate standard).

The term "melt polymerization conditions" is understood to mean those conditions necessary to effect reaction between an aromatic dihydroxy compound and a diaryl carbonate in the presence of a transesterification catalyst. Typically, solvents are not used in the process, and the reactants aromatic dihydroxy compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

Catalysts used in the melt transesterification polymerization production of polycarbonates can include alpha and/or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkaline earth hydroxides such as magnesium hydroxide and calcium hydroxide. Sources of alkali metal ions can include the alkali metal hydroxides such as illustrated by lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. Of these, sodium hydroxide is particularly desirable. The alpha catalyst typically will be used in an amount sufficient to provide $1 \times 10^{-2}$ to $1 \times 10^{-8}$ moles, specifically, $1 \times 10^{-4}$ to $1 \times 10^{-7}$ moles of metal hydroxide per mole of the dihydroxy compounds employed. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the alpha catalyst can comprise alkali metal salt(s) of a carboxylic acid, alkaline earth metal salt(s) of a carboxylic acid, or a combination comprising at least one of the foregoing. In another example, the alpha catalyst comprises $Na_2Mg$ EDTA or a salt thereof.

The alpha transesterification catalyst can also, or alternatively, comprise salt(s) of a non-volatile inorganic acid. For example, the alpha catalyst can comprise salt(s) of a non-volatile inorganic acid such as $NaH_2PO_3$, $NaH_2PO_4$, $Na_2HPO_3$, $KH_2PO_4$, $CsH_2PO_4$, $Cs_2HPO_4$, and combinations comprising at least one of the foregoing. Alternatively, or in addition, the alpha transesterification catalyst can comprise mixed alkali metal salt(s) of phosphoric acid, such as $NaKHPO_4$, $CsNaHPO_4$, $CsKHPO_4$, and combinations comprising at least one of the foregoing.

In addition, transesterification catalyst(s) can be employed. Transesterification catalysts can include catalysts of formula $(R^3)_4Q^+X$, wherein each $R^3$ is the same or different, and is a $C_{1-10}$ alkyl group; Q is a nitrogen or phosphorus atom; and X is a halogen atom, a $C_{1-8}$ alkoxy group, or a $C_{6-18}$ aryloxy group. Specific examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Possible beta catalyst(s) can comprise a quaternary ammonium compound, a quaternary phosphonium compound, or a combination comprising at least one of the foregoing. The quaternary ammonium compound can be organic ammonium compound(s) having structure,

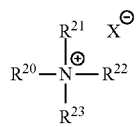

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. Optionally, anion $X^-$ can be selected from hydroxide, halide, carboxylate, sulfonate, sulfate, formate, carbonate, and bicarbonate. Some non-limiting examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often employed.

The quaternary phosphonium compound can be of organic phosphonium compounds having structure,

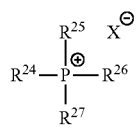

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an anion (e.g., an organic or inorganic anion). Optionally, anion $X^-$ can be selected from hydroxide, halide, alkoxide, aryloxide, carboxylate, sulfonate, sulfate, formate, carbonate, and bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$.

Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often employed.

The amount of beta catalyst employed is typically based upon the total number of moles of dihydroxy compound employed in the polymerization reaction. When referring to the ratio of beta catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of beta catalyst (e.g., organic ammonium or phosphonium salts) employed typically will be $1 \times 10^{-2}$ to $1 \times 10^{-5}$, specifically $1 \times 10^{-3}$ to $1 \times 10^{-4}$ moles per total mole of the dihydroxy compounds in the reaction mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 weight %. Mixtures comprising linear polycarbonates and branched polycarbonates can be used. The content of the following branching structures is 2,000 ppm or below.

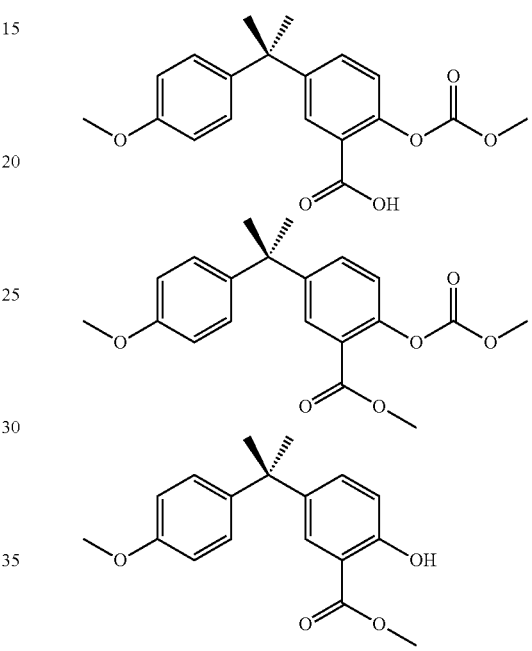

After the polycarbonate is prepared, it can be combined with polydiorgano siloxane having a kinematic viscosity of less than or equal to 20 mm²/sec at 25° C. (specifically, 15 mm²/sec to 20 mm²/sec) determined in accordance with ASTM D445 as a mold release agent.

The polydiorgano siloxane can have a phenyl content. For example, the polydiorgano siloxane can comprise the formula

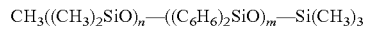

wherein the ratio of m/n is 0.8 to 1.6, specifically, 1.0 to 1.6, and more specifically, 1.0 to 1.4.

In addition to the polydiorgano siloxane, other additive(s) can optionally be added to the polycarbonate. Various additives can be employed, with the proviso that the additive(s) are selected so as to not significantly adversely affect the desired properties of the thermoplastic composition, in particular transparency, e.g., as determined by the amount of haze. Such additives can be mixed at a suitable time during the mixing of the components for forming the composition. Possible additives include impact modifiers, fillers, reinforcing agents, antioxidants, heat stabilizers, light stabilizers (e.g., ultraviolet (UV) light stabilizers (also referred to as UV absorbers)), plasticizers, lubricants, mold release agents (other than polydiorgano siloxanes), antistatic agents, colorants (such as such as titanium dioxide, carbon black, and organic dyes), surface effect additives, radiation stabilizers, flame retardants, and anti-drip agents, as well as combinations comprising at least one of the foregoing. A combination of additives can be used, for example a combination of a heat stabilizer, mold release agent, and ultraviolet light stabilizer. In general, the additives can be used in the amounts effective for the given purpose. The total amount of additives (other than any impact modifier, filler, or reinforcing agents) is generally 0.01 to 5 wt %, based on the total weight of the polycarbonate composition. Optionally, the composition can be free of potassium perfluorobutane sulfonate (Rimar salt).

Heat stabilizer additives include organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. The heat stabilizer can be tris(2,4-di-t-butylphenyl)phosphate available as IRGAPHOS* 168. Heat stabilizers are generally used in amounts of 0.01 to 5 parts by weight, based on 100 parts by weight of polycarbonate.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

Catalyst quenchers can be phosphorus containing derivatives, such as organic phosphites as well as phosphorous acid. Examples include but are not limited to diphosphites, phosphonates, metaphosphoric acid; arylphosphinic and arylphosphonic acids. Examples of quenchers can be found, for instance, in U.S. Pat. No. 6,504,000, U.S. Pat. No. 6,136,945, and U.S. Pat. No. 5,606,007.

It should be noted that some quenchers, as in the class of phosphites, also provide the polycarbonate additional desirable properties, e.g., fire resistance. The stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate, or a combinations comprising at least one of the foregoing. The acidic phosphate salts include sodium dihydrogen phosphate, mono zinc phosphate, potassium hydrogen phosphate, calcium dihydrogen phosphate and the like. The phosphites can be of the formula IX:

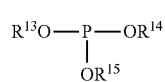

(IX)

where $R^{13}$, $R^{14}$ and $R^{15}$ are independently selected from the group consisting of hydrogen, alkyl and aryl with the proviso that at least one of $R^{13}$, $R^{14}$ and $R^{15}$ is hydrogen. The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates can be of the formula X:

(X)

wherein M is a metal, x is a number ranging from 1 to 12 and y is a number ranging 1 to 12, n is a number from 2 to 10, z is a number from 1 to 5 and the sum of (zx)+y is equal to n+2. M can be an alkaline or alkaline earth metal. The quenchers can be oxo acids of phosphorus or acidic organo phosphorus compounds.

The amount of the quencher added to the thermoplastic composition is an amount that is effective to stabilize the polycarbonate composition. The amount can be at least 0.0000005 weight percent, specifically at least 0.000001 weight percent based on the total amounts of the polycarbonate compositions. The amount of quencher mixture present can be less than or equal to 0.2 weight percent, specifically it can be less than or equal to 0.05 weight percent. The amount of quencher can be in a range of 0.5 to 2,000 parts per million percent based on the total amounts of the polycarbonate composition. The amount of quencher can be of 1 to 1,000 parts per million percent based on the total amounts of the said thermoplastic composition.

Light stabilizers and/or ultraviolet light (UV) absorbing additives, also referred to as UV stabilizers, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene)bis(4H-3,1-benzoxazin-4-one) (CYASORB* UV-3638); poly[(6-morpholino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (UVINUL*3008), 6-tert-butyl-2-(5-chloro-2H-benzotriazole-2-yl)-4-methylphenyl (UVINUL*3026), 2,4-di-tert-butyl-6-(5-chloro-2H-benzotriazole-2-yl)-phenol (UVINUL*3027), 2-(2H-benzotriazole-2-yl)-4,6-di-tert-pentylphenol (UVINUL*3028), 2-(2H-benzotriazole-2-yl)-4-(1,1,3,3-tetramethylbutyl)-phenol (UVINUL*3029), 1,3-bis[(2'cyano-3',3'-diphenylacryloyl)oxy]-2,2-bis-{[(2'-cyano-3',3'-diphenylacryloyl)oxy]methyl}-propane (UVINUL*3030), 2-(2H-benzotriazole-2-yl)-4-methylphenol (UVINUL*3033), 2-(2H-benzotriazole-2-yl)-4,6-bis(1-methyl-1-phenyethyl)phenol (UVINUL*3034), ethyl-2-cyano-3,3-diphenylacrylate (UVINUL*3035), (2-ethylhexyl)-2-cyano-3,3-diphenylacrylate (UVINUL*3039), N,N'-bisformyl-N,N'-bis(2,2,6,6-tetramethyl-4-piperidinyl)hexamethylendiamine (UVINUL*4050H), bis-(2,2,6,6-tetramethyl-4-pipieridyl)-sebacate (UVINUL*4077H), bis-(1,2,2,6,6-pentamethyl-4-piperdiyl)-sebacate+methyl-(1,2,2,6,6-pentamethyl-4-pip-eridyl)-sebacate (UVINUL*4092H) 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis

[(2-cyano-3,3-diphenylacryloyl)oxy]-2,2-bis[[(2-cyano-3,3-diphenylacryloyl)oxy]methyl]propane; TINUVIN* 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of polycarbonate and impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB* 5411 commercially available from Cytec Industries, Inc., Woodland Park, N.J.) and 2,2'-(1,4-phenylene)bis(4H-3,1-benzoxazin-4-one) (e.g., CYASORB* UV-3638, commercially available from Cytec Industries, Inc., Woodland Park, N.J.), and combinations comprising at least one of the foregoing. The UV stabilizers can be present in an amount of 0.01 wt % to 1 wt %, specifically, 0.1 wt % to 0.5 wt %, and more specifically 0.15 wt % to 0.4 wt %, based upon the total weight of the polycarbonate composition.

Coloring agents such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The method of making the polycarbonate can comprise adding the mold release agent, and optionally additive(s) to the polycarbonate, e.g., in an extruder. For example, the method for manufacturing a polycarbonate composition can comprise: reacting an aromatic dihydroxy compound and a diaryl carbonate in the presence of a catalyst to form a polycarbonate; and adding to the polycarbonate a polydiorgano siloxane having a kinematic viscosity of less than or equal to 20 $mm^2$/sec at 25° C. as determined in accordance with ASTM D445, and optionally an additive, to form the polycarbonate composition.

The polydiorgano siloxane can have a kinematic viscosity of less than 20 $mm^2$/sec at 25° C. and the 3.0 mm plaque of the polycarbonate composition can have a haze of less than 1% as determined in accordance with ASTM D1003-07, Procedure A, using a "Haze-gard dual" from BYK Gardner, with CIE illuminant D65.

Optionally, the polycarbonate composition can comprise 0.001 wt % to 5.0 wt % the polydiorgano siloxane, specifically, 0.001 wt % to 2.0 wt %, and more specifically, 0.24 wt % to 0.30 wt %, based upon a total weight of the composition. The polycarbonate composition can optionally further comprise 0.001 wt % to 5.0 wt % UV absorber, specifically, 0.001 wt % to 2.0 wt %, based upon a total weight of the composition. The polycarbonate composition can optionally further comprise 0.001 wt % to 2 wt % heat stabilizer, specifically, 0.001 wt % to 1.0 wt %, based upon a total weight of the composition.

Advantageously, a 3 mm plaque of the polycarbonate composition has a haze of less than or equal to 1%. "Haze" as used herein may mean that percentage of transmitted light, which in passing through a specimen deviates from the incident beam by forward scattering. Haze may be measured according to ASTM D1003-07, Procedure A, using a "Haze-gard dual" from BYK Gardner, with CIE illuminant D65. The polycarbonate compositions can be used for optical applications such as automotive headlamps, light covers, see-through protective coverings, lenses, media storage disks, and transparent films, as well as other applications where low haze is desirable. Accordingly, the present disclosure also provides articles of manufacture which contains the polycarbonate compositions having improved transparency.

Included herein are the following embodiments:

Embodiment 1 a method for manufacturing a polycarbonate composition comprises: reacting an aromatic dihydroxy compound and a diaryl carbonate in the presence of a catalyst to form a polycarbonate; and adding to the polycarbonate a polydiorgano siloxane having a kinematic viscosity of less than or equal to 20 $mm^2$/sec at 25° C. as determined in accordance with ASTM D445, and optionally an additive, to form the polycarbonate composition. A 3 mm plaque of the polycarbonate composition has a haze of less than or equal to 1% as determined in accordance with ASTM D1003-07, Procedure A, illuminant CIE-D65.

Embodiment 2 the method of Embodiment 1, wherein the polycarbonate composition comprises 0.001 wt % to 5.0 wt % the polydiorgano siloxane, 0.001 wt % to 5.0 wt % UV absorber, 0.001 wt % to 2 wt % heat stabilizer.

Embodiment 3 the method of any of Embodiments 1-2, wherein the polycarbonate composition comprises 0.001 wt % to 2.0 wt % the polydiorgano siloxane, 0.01 wt % to 2.0 wt % UV absorber, 0.001 wt % to 2 wt % heat stabilizer.

Embodiment 4 the method of any of Embodiments 1-3, wherein the polycarbonate composition comprises 0.24 wt % to 0.3 wt % the polydiorgano siloxane.

Embodiment 5 the method of any of Embodiments 1-4, wherein the kinematic viscosity is 15 mm$^2$/sec to 20 mm$^2$/sec at 25° C.

Embodiment 6 the method of any of Embodiments 1-5, wherein the kinematic viscosity is 16 mm$^2$/sec to 19 mm$^2$/sec at 25° C.

Embodiment 7 the method of any of Embodiments 1-6, wherein the polydiorgano siloxane comprises the formula $CH_3((CH_3)_2SiO)_n-((C_6H_5)_2SiO)_m-Si(CH_3)_3$.

Embodiment 8 the method of Embodiment 7, wherein a ratio of m/n is 0.8 to 1.6.

Embodiment 9 the method of Embodiment 7, wherein the ratio of m/n is 1.0 to 1.6.

Embodiment 10 the method of Embodiment 7, wherein the ratio of m/n is 1.0 to 1.4.

Embodiment 11 the method of any of Embodiments 1-10, wherein the dihydroxy compound is 1,1-bis(4-hydroxyphenyl) methane, 1,1-bis(4-hydroxyphenyl) ethane, 2,2-bis(4-hydroxyphenyl) propane (BPA), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), 1,1-bis(4-hydroxy-3-methylphenyl)cyclohexane (DMBPC), or a combination comprising at least one of the foregoing.

Embodiment 12

The method of any of Embodiments 1-11, wherein the dicarbonate is diphenyl carbonate, bis(4-methylphenyl)carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl)carbonate, bis(2-nitrophenyl) carbonate, bis(methyl salicyl) carbonate, or a combination comprising at least one of the foregoing.

Embodiment 13

The method of any of Embodiments 1-12, comprising the additive, wherein the additive is a heat stabilizer, catalyst quencher, UV absorber, coloring agent, plasticizer, lubricant, mold release agent other than polydiorgano siloxanes, or a combination comprising at least one of the foregoing additives.

Embodiment 14

The method of any of Embodiments 1-13, wherein the polycarbonate composition is free of potassium perfluorobutane sulfonate.

Embodiment 15

The method of any of Embodiments 1-14, wherein the polydiorgano siloxane has a phenyl content.

Embodiment 16

The method of any of Embodiments 1-15, wherein the process is a continuous melt process.

Embodiment 17

A polycarbonate composition manufactured by any of the method of Embodiments 1-16.

Embodiment 18

The polycarbonate composition of Embodiment 17, comprising less than or equal to 2,000 ppm of the following branching structures:

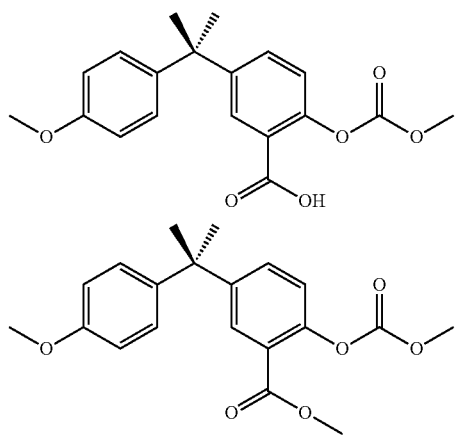

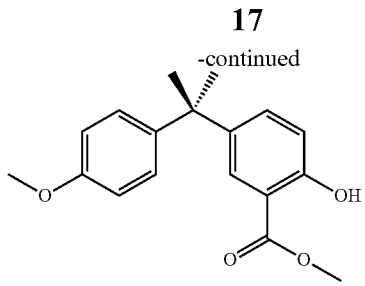

Embodiment 19

The polycarbonate of any of Embodiments 17-18, wherein the polycarbonate composition has a melt volume rate of 3 to 90 cc/10 min, when measured at 300° C. under a load of 1.2 kg according to according to ASTM D1238-04.

Embodiment 20

The polycarbonate of any of Embodiments 17-19, wherein the polycarbonate composition has a melt volume rate of 3 to 56 cc/10 min, when measured at 300° C. under a load of 1.2 kg according to according to ASTM D1238-04.

Embodiment 21

The polycarbonate of any of Embodiments 17-20, wherein the polycarbonate composition has a melt volume rate of 10 to 35 cc/10 min, when measured at 300° C. under a load of 1.2 kg according to according to ASTM D1238-04.

Embodiment 22

The polycarbonate of any of Embodiments 17-21, wherein the polycarbonate composition has an endcap percentage of 65% to 90%.

Embodiment 23

The polycarbonate of any of Embodiments 17-22, wherein the polycarbonate composition has an endcap percentage of 70% to 85%.

Embodiment 24

The polycarbonate of any of Embodiments 17-23, wherein the polycarbonate composition has a Fries content of 200 ppm to 2750 ppm.

Embodiment 25

The polycarbonate of any of Embodiments 17-24, wherein the polycarbonate composition has a Fries content of 300 ppm to 1000 ppm.

Embodiment 26

An article of manufacture comprising the polycarbonate composition of any of Embodiments 17-25.

Embodiment 27

The article of Embodiment 26, wherein the article is a vehicle headlamp.

EXAMPLES

Materials

Materials for the following examples are listed in Table 1. A melt polycarbonate (PC) with the characteristics in Table 1 is prepared in a continuous polycarbonate plant. The molten polymer resulting from the last polymerization stage is fed into a 6 barrel, L/D=21, twin screw extruder where it is blended with the additives listed in Table 1. Resulting product is melt filtered, stranded, and pelletized.

TABLE 1

| Component | Description | Source |
|---|---|---|
| Polycarbonate (PC) | Bisphenol A polycarbonate prepared from a continuous melt process; MVR (cc/10 min @ 300° C./1.2 kg) of 16, an endcap ratio of 78% and 650 ppm of branching and quenched using 3 ppm of Butyl Tosylate. | SABIC Innovative Plastics |
| Cyasorb* UV5411 | 2-(2H-benzotriazol-2-yl)-4-(1,1,3,3-tetramethylbutyl)-phenol | CYTEC Industries |
| Irgafos* 168 | tris(2,4-di-t-butylphenyl) phosphite | Ciba Specialty Chemicals |
| Tint | Solvent Violet 13 | — |
| Poly-dimethyldiphenyl siloxane | — | — |

Testing Methods.

Standard ASTM testing was performed at 50% relative humidity (RH) and unless otherwise indicated at room temperature (RT).

The reported haze data was measured using 3 mm thick plaques according to ASTM D1003-07, Procedure A, using a "Haze-gard dual" from BYK Gardner, with CIE illuminant D65.

The reported viscosity was measured using Canno-Fenske Visco meter at 25° C., in accordance with ASTM D445.

Examples 1-5

Examples 1-5 show the impact of additives on haze of polycarbonate. UV absorber, heat stabilizer, release agent and tint were added to polycarbonate in amounts shown in Table 2. The haze of the obtained composition was observed visually on 3.0 mm plaques, and the results were recorded in Table 2. Table 2 indicates that release agent, dimethyl diphenyl siloxane (kinetic viscosity of 25 mm$^2$/s) having polymethyl phenyl siloxane skeleton, had significant impact on haze generation, whereas other additives resulted in essentially no impact on haze.

TABLE 2

| Example | UV absorber UV5411 (ppm) | Heat stabilizer Irgafos 168 (ppm) | Release agent Poly-dimethyldiphenyl siloxane (ppm) | Tint Solvent Violet 13 (ppm) | Haze visually |
|---|---|---|---|---|---|
| 1 | 3,000 | 1,000 | 0 | 0 | Not detected |
| 2 | 3,000 | 1,000 | 0 | 0.7 | Not detected |
| 3 | 0 | 0 | 3,000 | 0.7 | Detected |
| 4 | 3,000 | 1,000 | 3,000 | 0.7 | Detected |
| 5 | 3,000 | 1,000 | 1,500 | 0.7 | Slightly detected |

Examples 6-10

In these experiments the effect of the release agent having polymethylphenyl skeleton (polydimethyldiphenyl siloxane)

was studied in detail to determine an impact on the haze of a polycarbonate composition. The polycarbonate composition contained polycarbonate as shown in Example 4 in Table 1, 1,000 ppm of Irgafos* 168, 3,000 ppm of UV5411, 3 ppm of quencher butyl tosylate, and 0.7 ppm of tint. Several lots of the polydimethyl diphenyl siloxane release agent were added to a polycarbonate composition in an amount of 3,000 ppm, and the effects over the haze were studied. The results are shown in Table 3.

Table 3 shows the relationship between the viscosity of polydimethyldiphenol siloxane and % haze of the polycarbonate composition to which the polydimethyldiphenol siloxane was added. The results indicate that the viscosity parameter of the release agent, surprisingly, is the factor that has direct impact on the optical properties of the polycarbonate composition.

TABLE 3

| Example | Viscosity (mm$^2$/sec) | Haze (%) |
|---|---|---|
| 6 | 18.4 | 0.24 |
| 7 | 18.0 | 0.25 |
| 8 | 24.1 | 2.54 |
| 8 | 28.6 | 2.54 |
| 10 | 18.4 | 0.30 |

The relationship of the viscosity and haze is also illustrated in FIG. 1. As shown in FIG. 1, by keeping the kinematic viscosity of the release agent (polydimethyldiphenyl siloxane) at less than or equal to 20 mm$^2$/sec, 3 mm thick plaques formed from the polycarbonate compositions have haze of less than or equal to 1%.

In general, the invention can alternately comprise, consist of, or consist essentially of, any appropriate components herein disclosed. The invention can additionally, or alternatively, be formulated so as to be devoid, or substantially free, of any components, materials, ingredients, adjuvants or species used in the prior art compositions or that are otherwise not necessary to the achievement of the function and/or objectives of the present invention.

Fries-content was measured by the KOH methanolysis of resin and is reported as parts per million by weight (ppm). The Fries content for each of the melt polycarbonates was determined as follows. First, 0.30 grams of polycarbonate was dissolved in 5.0 ml of THF (containing p-terphenyl as internal standard). Next, 2.6 ml of 10% KOH in methanol was added to this solution.

The resulting mixture was stirred for two hours at ambient temperature. Next, 1.0 ml of acetic acid was added, and the mixture was stirred for 5 minutes. Potassium acetate by-product was allowed to crystalline over 1 hour. The solid was filtered off and the resulting filtrate was analyzed by liquid chromatography using p-terphenyl as the internal standard.

All ranges disclosed herein are inclusive of the endpoints, and the endpoints are independently combinable with each other (e.g., ranges of "up to 25 wt. %, or more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

While particular embodiments have been described for the purpose of illustration, the foregoing descriptions should not be deemed to be a limitation on the scope herein. Alternatives, modifications, variations, improvements, and substantial equivalents are also included. Accordingly, the appended claims as filed and as they can be amended are intended to embrace all such alternatives, modifications variations, improvements, and substantial equivalents.

The invention claimed is:

1. A method for manufacturing a polycarbonate composition comprising:
   reacting an aromatic dihydroxy compound and a diaryl carbonate in the presence of a catalyst to form a polycarbonate; and
   adding to the polycarbonate a polydiorgano siloxane having a kinematic viscosity of less than or equal to 20 mm$^2$/sec at 25° C. as determined in accordance with ASTM D445, and optionally an additional additive, to form the polycarbonate composition;
   wherein the polydiorgano siloxane has a phenyl content;
   wherein a 3 mm plaque of the polycarbonate composition has a haze of less than or equal to 1% as determined in accordance with ASTM D1003-07, Procedure A, illuminant CIE-D65; and
   wherein the polydiorgano siloxane comprises the formula $CH_3((CH_3)_2SiO)_n$—$((C_6H_5)_2SiO)_m$—$Si(CH_3)_3$, wherein a ratio of m/n is 1.0 to 1.6.

2. The method of claim 1, wherein the polycarbonate composition comprises 0.001 wt % to 5.0 wt % the polydiorgano siloxane, 0.001 wt % to 5.0 wt % UV absorber, 0.001 wt % to 2 wt % heat stabilizer.

3. The method of claim 1, wherein the polycarbonate composition comprises 0.001 wt % to 2.0 wt % the polydiorgano siloxane, 0.01 wt % to 2.0 wt % UV absorber, 0.001 wt % to 2 wt % heat stabilizer.

4. The method of claim 1, wherein the polycarbonate composition comprises 0.24 wt % to 0.3 wt % the polydiorgano siloxane.

5. The method of claim 1, wherein the kinematic viscosity is 15 mm$^2$/sec to 20 mm$^2$/sec at 25° C.

6. The method of claim 1, wherein the kinematic viscosity is 16 mm$^2$/sec to 19 mm$^2$/sec at 25° C.

7. The method of claim 1, comprising the additional additive, wherein the additional additive is a heat stabilizer, catalyst quencher, UV absorber, coloring agent, plasticizer, lubricant, mold release agent other than polydiorgano siloxanes, or a combination comprising at least one of the foregoing additives.

8. The method of claim 1, wherein the dihydroxy compound is 1,1-bis(4-hydroxyphenyl)methane, 1,1-bis(4-hydroxyphenyl)ethane, 2,2-bis(4-hydroxyphenyl)propane (BPA), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl- 3,3-bis(4-hydroxyphenyl)phthalimidine (PPPBP), 1,1-bis(4-hydroxy-3-methylphenyl)cyclohexane (DMBPC), or a combination comprising at least one of the foregoing.

9. The method of claim 1, wherein the dicarbonate is diphenyl carbonate, bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, bis(methyl salicyl)carbonate, or a combination comprising at least one of the foregoing.

10. The method of claim 1, wherein the polycarbonate composition is free of potassium perfluorobutane sulfonate.

11. The method of claim 1, wherein the polycarbonate composition has a melt volume rate of 3 to 90 cc/10 min, when measured at 300° C. under a load of 1.2 kg according to according to ASTM D1238-04; wherein the polycarbonate composition has an endcap percentage of 65% to 90%; and wherein the polycarbonate composition has a Fries content of 200 ppm to 3000 ppm.

12. The method of claim 1, wherein the polycarbonate composition has a melt volume rate of 3 to 56 cc/10 min, when measured at 300° C. under a load of 1.2 kg according to according to ASTM D1238-04; wherein the polycarbonate composition has an endcap percentage of 65% to 90%; and wherein the polycarbonate composition has a Fries content of 200 ppm to 2750 ppm.

13. The method of claim 1, wherein the polycarbonate composition has a melt volume rate of 10 to 35 cc/10 min, when measured at 300° C. under a load of 1.2 kg according to according to ASTM D1238-04; wherein the polycarbonate composition has an endcap percentage of 70% to 85%; and wherein the polycarbonate composition has a Fries content of 300 ppm to 1000 ppm.

14. A polycarbonate composition manufactured by the method of claim 1.

15. An article of manufacture comprising the polycarbonate composition of claim 14.

16. The article of claim 15, wherein the article is a vehicle headlamp.

* * * * *